(12) United States Patent
Yamada et al.

(10) Patent No.: US 8,369,018 B2
(45) Date of Patent: Feb. 5, 2013

(54) SPATIAL IMAGE DISPLAY DEVICE

(75) Inventors: Masahiro Yamada, Kanagawa (JP);
Sunao Aoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/143,059

(22) PCT Filed: Jan. 15, 2010

(86) PCT No.: PCT/JP2010/050427
§ 371 (c)(1),
(2), (4) Date: Jun. 30, 2011

(87) PCT Pub. No.: WO2010/084829
PCT Pub. Date: Jul. 29, 2010

(65) Prior Publication Data
US 2011/0255170 A1 Oct. 20, 2011

(30) Foreign Application Priority Data
Jan. 22, 2009 (JP) ................... 2009-011585

(51) Int. Cl.
*G02B 27/10* (2006.01)
(52) U.S. Cl. ................... 359/619; 359/621; 359/622
(58) Field of Classification Search .......... 359/619–627, 359/290–292, 298
See application file for complete search history.

(56) References Cited

U.S. PATENT DOCUMENTS

| | | | |
|---|---|---|---|
| 5,392,140 A | 2/1995 | Ezra et al. | |
| 5,500,692 A * | 3/1996 | Onozuka | 348/759 |
| 6,064,424 A | 5/2000 | Van Berkel et al. | |
| 2005/0270645 A1 | 12/2005 | Cossairt et al. | |
| 2006/0187377 A1* | 8/2006 | You et al. | 349/64 |
| 2006/0215273 A1 | 9/2006 | Kuiper et al. | |
| 2007/0070476 A1 | 3/2007 | Yamada et al. | |
| 2007/0188517 A1 | 8/2007 | Takaki | |
| 2009/0052027 A1* | 2/2009 | Yamada et al. | 359/463 |
| 2010/0296148 A1* | 11/2010 | Reichelt et al. | 359/228 |

FOREIGN PATENT DOCUMENTS

| | | |
|---|---|---|
| JP | 2003-337303 | 11/2003 |
| JP | 2004-078086 | 3/2004 |
| JP | 2005-258421 | 9/2005 |
| JP | 2005-309374 | 11/2005 |
| JP | 2007-017635 | 1/2007 |
| JP | 2007-206655 | 8/2007 |

* cited by examiner

*Primary Examiner* — Thomas K Pham
*Assistant Examiner* — Brandi Thomas
(74) *Attorney, Agent, or Firm* — Robert J. Depke; Rockey, Depke & Lyons, LLC

(57) ABSTRACT

Provided is a spatial image display device capable of forming spatial images having a superior reality and high definition. A spatial image display device 10A is provided with: a display section 2 including a plurality of pixels 22, and generating a two-dimensional display image corresponding to a video signal; a first lens array 1 including a plurality of first lenses 11 provided in correspondence with the respective pixels 22, and allowing light passing through the respective pixels 22 to converge; and a second lens array 3 converting the converging light, which has passed through the first lens array 1, into parallel light or converging light, and allowing the converted light to pass therethrough. The light transmitting through the respective pixels 22 in the display section 2 is directed to the second lens array 3 after being converged by the first lens array 1. Accordingly, the light entering the second lens array 3 from the respective pixels 22 behaves like light emitted from a point source, and is converted easily into the parallel light or the converting light in the second lens array 3.

13 Claims, 14 Drawing Sheets

SPATIAL IMAGE DISPLAY DEVICE

CROSS-REFERENCES TO RELATED APPLICATIONS

This application is a 371 U.S. National Stage filing of PCT/JP2010/050427, filed Jan. 15, 2010, which claims priority to Japanese Patent Application Number JP 2009-011585 filed Jan. 22, 2009, all of which are incorporated herein by reference.

TECHNICAL FIELD

The present invention relates to a spatial image display device that displays three-dimensional video of an object in the space.

BACKGROUND ART

The generation of three-dimensional video is realized by the use of the human physiological functions of perception. That is, observers perceive three-dimensional objects in the course of the comprehensive processing in their brains based on the perception of a displacement of images respectively entering their right and left eyes (binocular parallax) and the perception with the angle of convergence, the perception with the physiological function that occurs when adjusting the focal length of crystalline lenses of the eyes using the ciliary body and the Zinn's zonule (the focal length adjustment function), and the perception of a change of image(s) seen when a motion is made (motion parallax). As a previous method of generating three-dimensional video utilizing the "binocular parallax" and the "angle of convergence" among the physiological functions of perception described above, there is a method of using glasses having different-colored right and left lenses to provide different images (parallax images) to right and left eyes, and a method of using goggles with a liquid crystal shutter to provide parallax images to right and left eyes by switching the liquid crystal shutter at a high speed, for example. There is also a method of representing three-dimensional images using a lenticular lens to allocate, to right and left eyes, images displayed on a two-dimensional display device respectively for the right and left eyes. Furthermore, similarly to such a method of using the lenticular lens, there is also a method developed for representing three-dimensional images by using a mask provided on the surface of a liquid crystal display to allow a right eye to view images for the right eye, and a left eye to view images for the left eye.

However, the methods of acquiring parallax images using the special glasses and goggles as described above are very annoying for the observers. On the other hand, with the method of using the lenticular lens, for example, it is necessary to divide the region of a single two-dimensional image display device into a region for the right eye and a region for the left eye. Therefore, such a method has an issue of being not appropriate for displaying images with high definition.

In consideration thereof, in recent years, the study has been made for a spatial image display device based on the light beam reproduction method (for example, see Non-Patent Literature 1). The light beam reproduction method is with the aim of representing spatial images by a large number of light beams irradiated from a display, and in theory, provides observers with precise information about motion parallax and information about focal length even with observation with naked eyes, so that the resulting spatial images are with the relatively low level of eye strain.

PRIOR ART LITERATURE

Non-Patent Literature

Non-Patent Literature 1: Yasuhiro TAKAGI, "Three-dimensional Images and Flat-panel Type Three-dimensional Display", Optical Society of Japan, Volume No. 35, Issue No. 8, 2006, p. 400 to 406

SUMMARY OF THE INVENTION

However, even with the light beam reproduction method as described above, in actuality, for acquiring a spatial image to be perceivable at a position away from the display surface of a display (in the direction vertical thereto), in the resulting spatial image, the level of three-dimensionality and the level of definition are reduced with the increase of a distance from the display surface of the display. This is possibly because two-dimensional display images to be displayed on the display surface of the display reach the observers' eyes as diverging light as are each configured by a plurality of pixels of finite size. In the below, the phenomenon as described above is described in detail by referring to FIGS. 12 and 13.

FIGS. 13(A) and 14(A) are each a conceptual view showing the ideal state in which an observer perceives a spatial image based on the light beam reproduction method. In FIG. 13(A), exemplified is a case of forming, at a predetermined position, an arbitrary point image Z1 configuring a certain spatial image. For forming the point image Z1, light beams L1 to L3 may be irradiated from a plurality of pixels on a display DP (three pixels PX1 to PX3 are typically represented here) so as to pass through the position where the point image Z1 is to be positioned. The light beams L1 to L3 irradiated as such reach a retina R after passing through a pupil P of the observer. At this time, the eye of the observer automatically adjusts the focal length of a focal length variable lens (lens body) provided in the eye such that the light beams L1 to L3 converge to a point on the retina R after passing through the pupil P. The focal length adjusted as such coincides with a case where a real object is placed at the position where the spatial image is positioned. Accordingly, the observer can perceive the spatial image (the point image Z1) as if it is positioned at the position where it is to be positioned. In this case, when the pixels PX1 to PX3 are each a point source that is with no divergence, as shown in FIG. 14(A), for example, the light beams L1 to L3 passing through a projector lens LN each form parallel light Lp whose thickness is unchanged. The projector lens LN is positioned away by a focal length FL thereof from a point source LS1 of the light beams L1 to L3.

In actuality, however, the light beams L1 to L3 respectively irradiated from the pixels PX1 to PX3 each form diverging light. This is because the pixels PX1 to PX3 are a group of light sources, that is, point sources, with finite divergence as described above. To be specific, as shown in FIG. 14(B), the light beams L1 to L3, passing through the projector lens LN positioned away by the focal length FL thereof from a light source LS2 extending on the finite region, form diverging light Ld, the thickness of which is increased gradually. Generally, the degree of divergence of the diverging light Ld varies depending on the area of the light source on the finite region, and with the smaller area thereof, it becomes more like a parallel light flux, and with the larger area thereof, the degree of divergence of the emitting light flux is increased. As such, in this case, although depending on the area occupied by each of the pixels PX1 to PX3, as shown in FIG. 13(B), for example, the observer may perceive the point image Z1 itself as being an image blurred over the finite region. As a result, the resulting spatial image configured by a plurality of point images Z1 may also lack in definition. Or as a result of the light beams L1 to L3 forming the diverging light, as shown in FIG. 13(C), the observer may look at the pixels PX1 to PX3 themselves on the display DP for searching for clearer point images. If this is the case, only three different point images are simply perceived on the display DP. As such, when the light beams coming from the pixels on the display form diverging light, there is a problem of blurring the spatial image or failing to perceive the spatial image. Such a problem becomes apparent especially when the spatial image is to be perceived at a position away from the display surface of the display. As such, there is a demand for a technology for allowing observers to perceive spatial images with more depth.

The present invention has been made in view of such problems, and an object thereof is to provide an a spatial image display device that can form spatial images having superior reality and having high definition.

A spatial image display device according to an embodiment of the invention includes: two-dimensional image generation means including a plurality of pixels, and generating a two-dimensional display image corresponding to a video signal; a first lens array including a plurality of first lenses provided in correspondence with the respective pixels, the first lenses allowing light passing through the respective pixels to converge; and a second lens array converting the converging light, which has passed through the first lens array, into parallel light or converging light, and allowing the converted light to pass therethrough. Herein, the wordings "the first lenses" are "provided in correspondence with the respective pixels" are not limited to a case where one first lens is provided for one pixel, and is a concept that includes also a case where a plurality of first lenses are provided for one pixel.

In the spatial image display device according to the embodiment of the invention, the light passing through the respective pixels in the two-dimensional image generation means is converged by the first lens array, and is then directed to the second lens array. Thus, since the light entering the second lens array behaves like light emitted from a point source, the light converged by the first lens array is easily converted by the second lens array into parallel light or converging light, and then passes therethrough. Hence, eyes of an observer perceive the spatial image formed by the parallel light or the converging light.

With the spatial image display device according to the embodiment of the invention, the light passing through the respective pixels in the two-dimensional image generation means is allowed to reach eyes of an observer not in a state of divergence but as the parallel light or the converging light. Therefore, it is possible for the observer to perceive three-dimensional video having superior reality (a sense of depth) and having high definition.

MODE FOR CARRYING OUT THE INVENTION

In the below, embodiments of the invention are described in detail by referring to the accompanying drawings. Note that the description is given in the following order.

1. First Embodiment (an example in which two-dimensional image generation means is placed between first and second lens arrays)

2. Second Embodiment (an example in which two-dimensional image generation means is placed on the side closer to a light source than a first lens array)

First Embodiment

Figure 1:
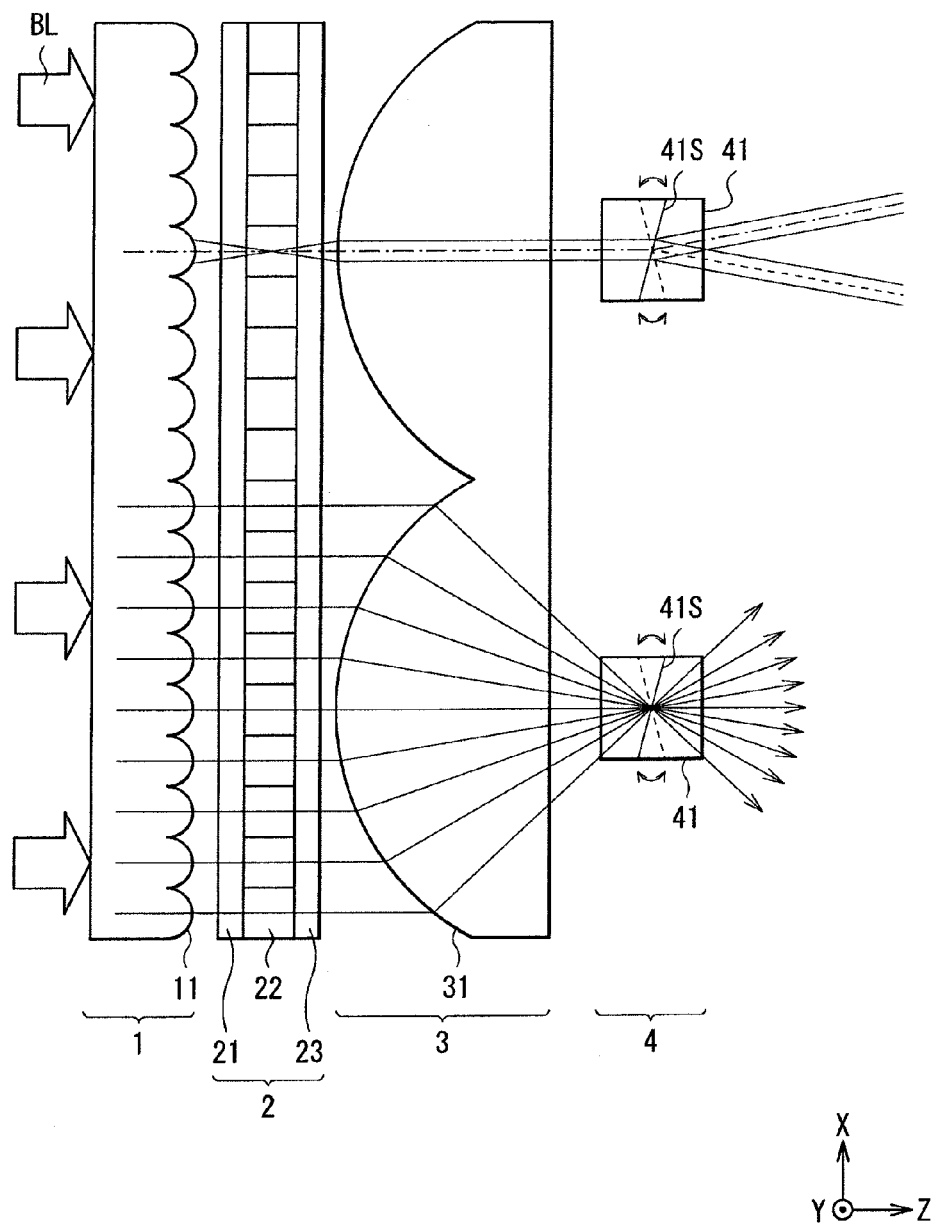
FIG. 1 A schematic diagram showing an exemplary configuration of a spatial image display device as a first embodiment of the invention.
Figure 2:
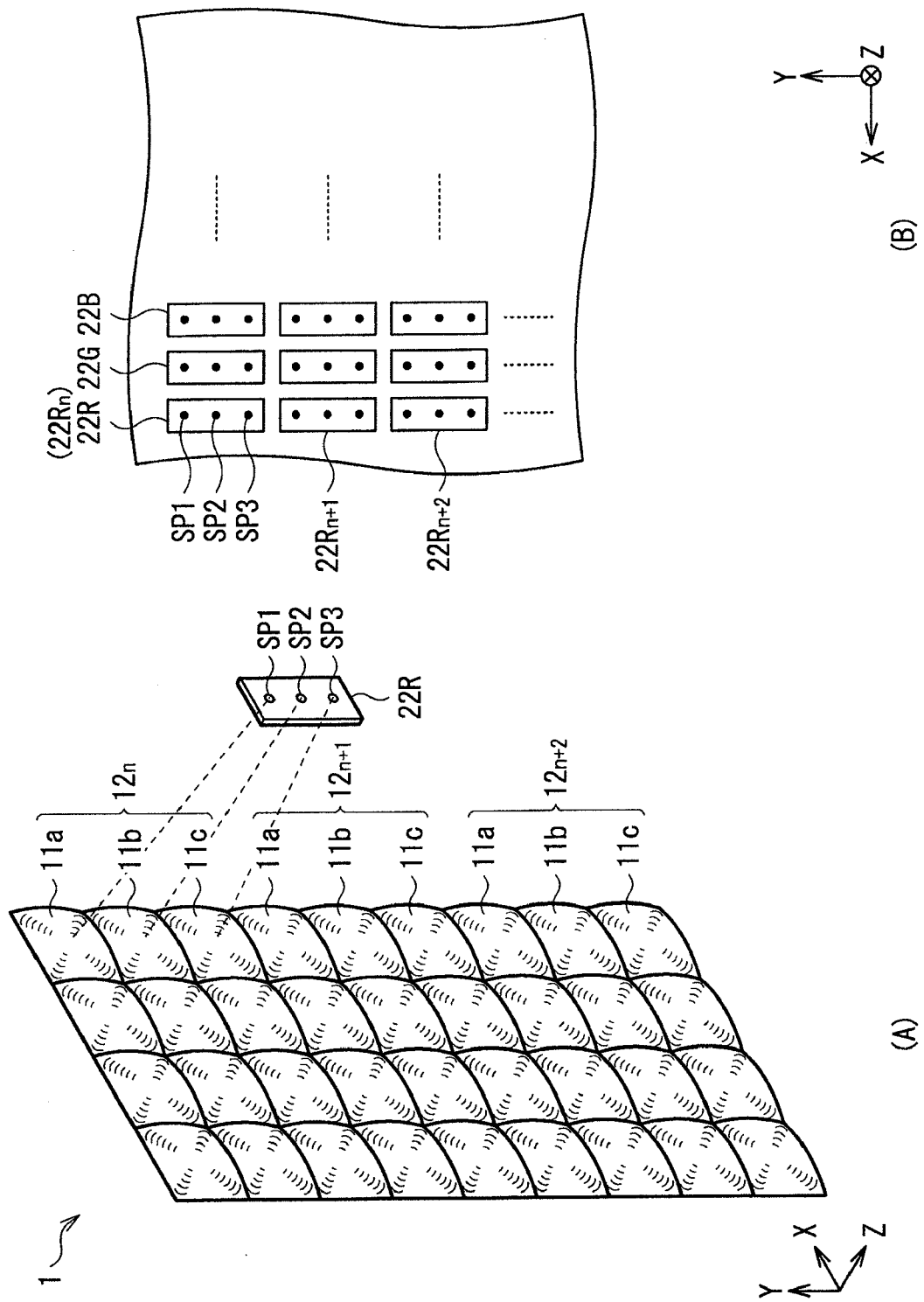
FIG. 2 A perspective diagram showing the configuration of a first lens array 1 shown in FIG. 1, and a plan view showing the placement of pixels 22 in a display section 2.
Figure 3:
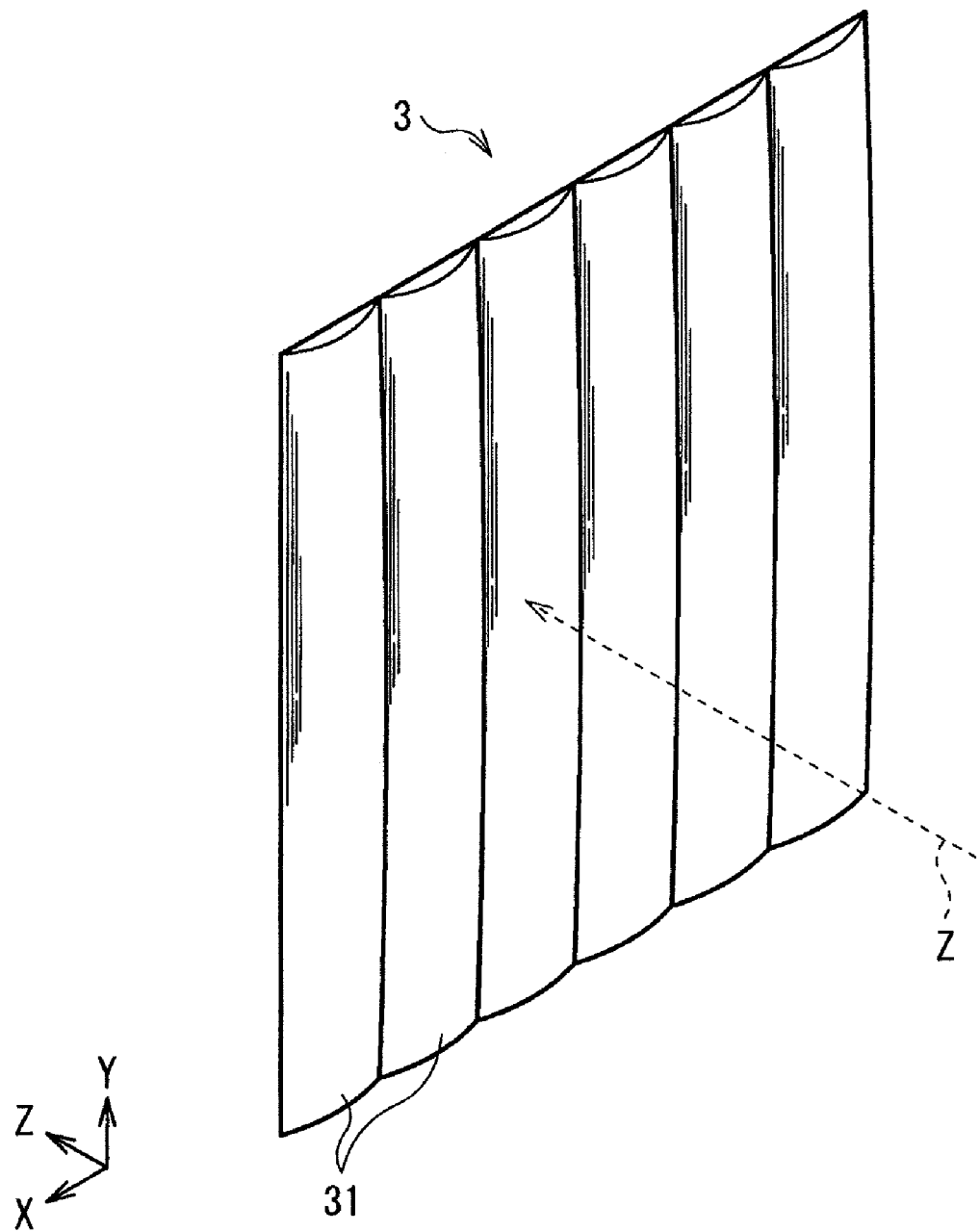
FIG. 3 A perspective diagram showing the configuration of a second lens array 3 shown in FIG. 1.
Figure 4:
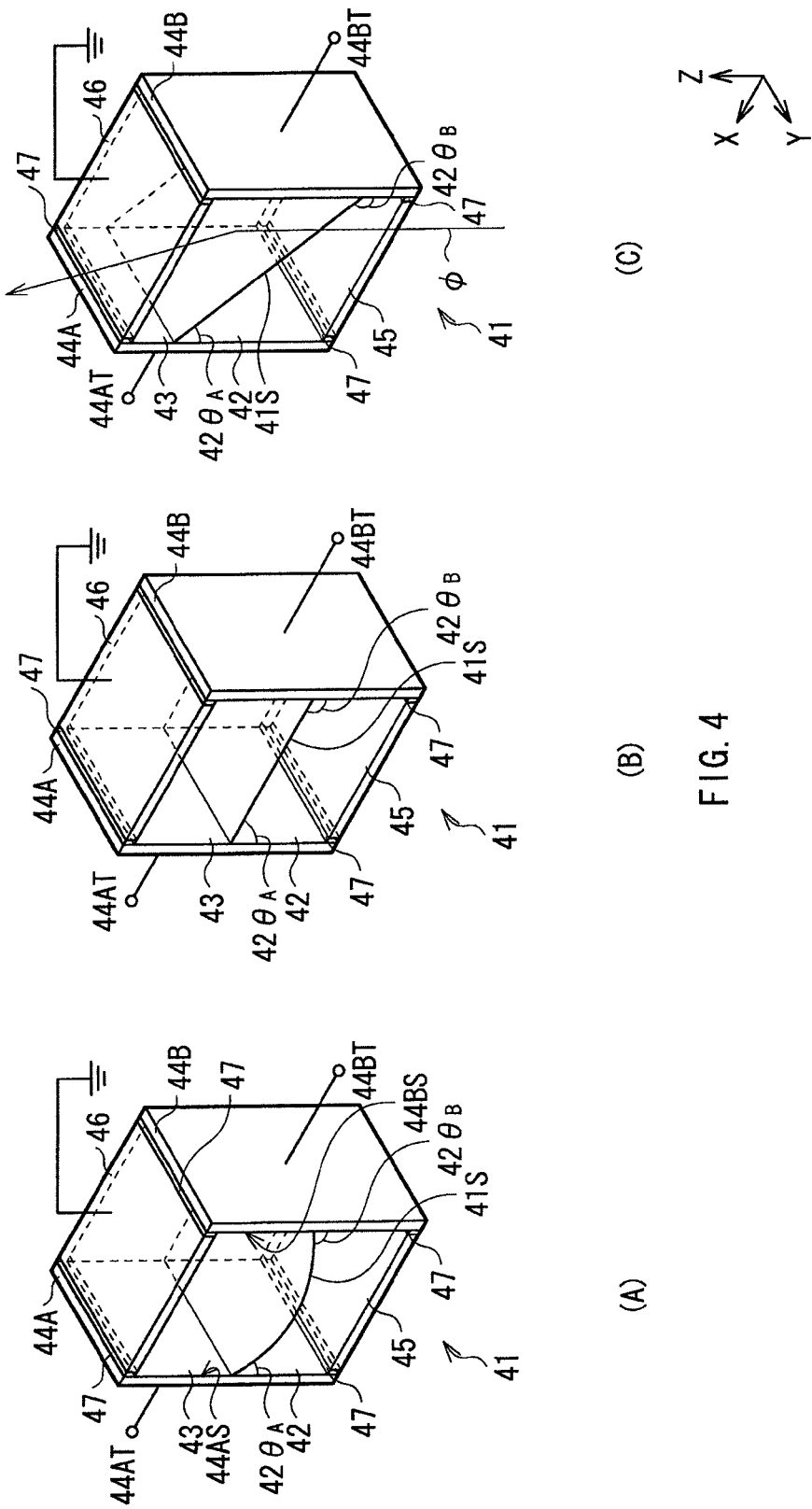
FIG. 4 Perspective diagrams each showing the configuration of a liquid optical element 41 in a deflection section 4 shown in FIG. 1.

First of all, by referring to FIGS. 1 to 4, described is a spatial image display device 10 (hereinafter, referred to as spatial image display device 10A for distinction from modified examples and the second embodiment that will be described later) as the first embodiment of the invention. FIG. 1 shows an exemplary configuration of the spatial image display device 10A in a horizontal plane. FIG. 2(A) shows the perspective configuration of a first lens array 1 shown in FIG. 1, and FIG. 2(B) shows the placement of pixels 22 on an XY plane of a display section 2 shown in FIG. 1. FIG. 3 shows the perspective configuration of a second lens array 3 shown in FIG. 1. FIG. 4 shows the specific configuration of a deflection section 4 (will be described later) shown in FIG. 1.

Configuration of Spatial Image Display Device

As shown in FIG. 1, the spatial image display device 10A is provided with the first lens array 1, the display section 2 including a plurality of pixels 22 (will be described later), the second lens array 3, and the deflection section 4, in order from the side of a light source (not shown).

The first lens array 1 has a plurality of microlenses 11 (11a, 11b, and 11c), which are arranged in a matrix along the plane (XY plane) orthogonal to the optical axis (Z axis) (FIG. 2(A)). The microlenses 11 are each for converging backlight BL coming from the light source, and for emitting it toward any of the corresponding pixels 22. The microlenses 11 each have the lens surface being spherical, and show the matching between the focal length of light passing through the horizontal plane (XZ plane) including the optical axis with the focal length of light passing through the plane (YZ plane) including the optical axis and being orthogonal to the horizontal plane. The microlenses 11 all desirably have the same focal length f11. For the backlight BL, diverging light such as fluorescent lamps may be used as it is, but desirably used therefor is parallel light as a result of collimating such diverging light using a collimator lens, for example, since this makes it easier to perform conversion into parallel light or converging light in the second lens array 3. Note that the details on the configuration and functions of the second lens array 3 will be described later. When allowing the diverging light to enter the first lens array 1 as it is as the backlight BL, with the larger spacing between the light source and the first lens array 1, the backlight BL immediately before entering the first lens array 1 is increased in degree of parallelism. On the contrary, with the smaller spacing between the light source and the first lens array 1, the backlight BL entering the first lens array 1 is reduced in degree of parallelism. The degree of parallelism of the backlight BL entering the first lens array 1 as such reflects the degree of parallelism of light emitted from the second lens array 3. Therefore, the light emitted from the second lens array 3 may be adjusted in degree of parallelism depending on the application (that is, depending on the distance between the virtual position of a spatial image for display and the display section).

The display section 2 is for generating a two-dimensional display image corresponding to a video signal, and specifically, is a color liquid crystal device that emits display image light by irradiation of the backlight BL. The display section 2 has a configuration in which a glass substrate 21, a plurality of pixels 22 each including a pixel electrode and a liquid crystal layer, and a glass substrate 23 are laminated in order from the side of the first lens array 1. The glass substrate 21 and the glass substrate 23 are both transparent, and either of these is provided with a color filter including colored layers of red (R), green (G), and blue (B). As such, the pixels 22 are grouped into pixels 22R displaying the color of red, pixels 22G displaying the color of green, and pixels 22B displaying the color of blue. In such a display section 2, as shown in FIG. 2(B), for example, the pixels 22R, the pixels 22G, and the pixels 22B are repeatedly arranged in order in the X-axis direction, but in the Y-axis direction, the arrangement is so made that the pixels 22 of the same color are aligned. In this specification, for convenience, the pixels 22 aligned in the X-axis direction are referred to as row, and the pixels 22 aligned in the Y-axis direction are referred to as column.

The pixels 22 are each in the rectangular shape extending in the Y-axis direction on the XY plane, and are provided corresponding to microlens groups 12 (FIG. 2(A)), each of which includes a group of microlenses 11a to 11c aligned in the Y-axis direction. That is, the first lens array 1 and the display section 2 have such a positional relationship that light having passed through the microlenses 11a to 11c of the microlens group 12 converges to spots SP1 to SP3 in an effective region of each of the pixels 22 (FIG. 2(A) and FIG. 2(B)). For example, after passing through the microlenses 11a to 11c of the microlens group $12_n$, the light converges to the spots SP1 to SP3 of the pixel $22R_n$. Similarly, the light coming from the microlens group $12_{n+1}$ converges to the pixel $22R_{n+1}$, and the light coming from the microlens group $12_{n+2}$ converges to the pixel $22R_{n+2}$. Note that one pixel 22 may be arranged corresponding to one microlens 11, or one pixel 22 may be arranged corresponding to two or four or more microlenses 11.

The second lens array 3 is for converting the light converged by passing through the first lens array 1 and the display section 2 into parallel light or converging light in the horizontal plane, and emitting the same. To be specific, the second lens array 3 is a so-called lenticular lens, and as shown in FIG. 3, for example, has a configuration in which a plurality of cylindrical lenses 31, each having the cylindrical surface surrounding the axis along the Y axis, are aligned along the X-axis direction. Accordingly, the cylindrical lenses 31 provide the refractive power on the horizontal plane including the optical axis (Z axis). In FIG. 1, one cylindrical lens 31 is provided for each of the nine columns of pixels 22 aligned along the X-axis direction, but this number is not limited thereto. Moreover, the cylindrical lens 31 may have the cylindrical surface surrounding the axis with a predetermined angle of tilt θ (θ<45°) from the Y axis. The cylindrical lenses 31 all desirably have mutually-equal focal length f31. Furthermore, a distance f13 between the first lens array 1 and the second lens array 3 is equal to the sum of the focal lengths thereof, that is, the sum |f11+f31| of the focal length f11 of the microlenses 11 and the focal length f31 of the cylindrical lenses 31, or is larger than the sum. When the distance f13 is equal to |f11+f31|, if the backlight BL is the parallel light, the light emitted from the cylindrical lenses 31 becomes also parallel light. On the other hand, when the distance f13 is larger than |f11+f31|, if the backlight BL is the parallel light, the light emitted from the cylindrical lenses 31 becomes converging light.

The deflection section 4 has a plurality of liquid optical elements 41, thereby deflecting the light emitted from the second lens array 3 in the horizontal plane (in the XZ plane) for every pixel 22 or for a group of pixels 22.

FIGS. 4(A) to 4(C) show the specific perspective configuration of the liquid optical element 41. As shown in FIG. 4(A), the liquid optical element 41 has a configuration in which a non-polarity liquid 42 and a polarity liquid 43, which are transparent and have different refractive indexes and interfacial tensions, are so disposed, on the optical axis (Z axis), as to be sandwiched between a pair of electrodes 44A and 44B made of copper or others. The pair of electrodes 44A and 44B are adhered and fixed to a bottom plate 45 and a top plate 46, both of which are transparent, via insulative sealing sections 47, respectively. The electrodes 44A and 44B are connected to an external power supply (not shown) via terminals 44AT and 44BT connected to the outer surfaces thereof, respectively. The top plate 46 is made of a transparent conductive material such as indium tin oxide (ITO: Indium Tin Oxide) and zinc oxide (ZnO), and functions as a ground electrode. The electrodes 44A and 44B are each connected to a control section (not shown), and each can be set to have a predetermined level of electric potential. Note that the side surfaces (XZ planes) different from the electrodes 44A and 44B are covered by a glass plate or others that is not shown, and the non-polarity liquid 42 and the polarity liquid 43 are in the state of being encapsulated in the space that is completely hermetically sealed. The non-polarity liquid 42 and the polarity liquid 43 are not dissolved and remain isolated from each other in the closed space, and form an interface 41S.

Inner surfaces (mutual opposing surfaces) 44AS and 44BS of the electrodes 44A and 44B are desirably covered by a hydrophobic insulation film. This hydrophobic insulation film is made of a material showing the hydrophobic property (the repellency) with respect to the polarity liquid 43 (more strictly, showing the affinity with respect to the non-polarity liquid 42 under an absence of electric field), and having the property excellent in terms of electric insulation. To be specific, exemplified are polyvinylidene fluoride (PVdF) and polytetrafluoroethylene (PTFE) being fluorine high polymer. Note that, for the purpose of improving further the electric insulation between the electrode 44A and the electrode 44B, any other insulation film made of spin-on glass (SOG) or others may be provided between the electrode 44A and the electrode 44B and the hydrophobic insulation film described above.

The non-polarity liquid 42 is a liquid material with almost no polarity and shows the electric insulation property, and silicone oil or others are suitably used, other than a hydrocarbon material such as decane, dodecane, hexadecane, or undecane, for example. When no voltage is applied between the electrode 44A and the electrode 44B, the non-polarity liquid 42 desirably has the capacity enough to cover entirely the surface of the bottom plate 45.

On the other hand, the polarity liquid 43 is a liquid material with the polarity, and an aqueous solution in which an electrolyte such as potassium chloride and sodium chloride is dissolved is suitably used, other than water, for example. When such a polarity liquid 43 is applied with a voltage, the wettability with respect to the hydrophobic insulation film (the contact angle between the polarity liquid 43 and the hydrophobic insulation film) shows a large change compared with the non-polarity liquid 42. The polarity liquid 43 is being in contact with the top plate 46 as a ground electrode.

The non-polarity liquid 42 and the polarity liquid 43 that are so encapsulated as to be enclosed by a pair of electrodes 44A and 44B, the bottom plate 45, and the top plate 46 are isolated from each other with no mutual mixture, and form the interface 41S. Note that the non-polarity liquid 42 and the polarity liquid 43 are so adjusted as to have almost the equal level of specific gravity with respect to each other, and the positional relationship between the non-polarity liquid 42 and the polarity liquid 43 is determined by the order of encapsulation. Because the non-polarity liquid 42 and the polarity liquid 43 are transparent, light passing through the interface 41S is refracted in accordance with the angle of incidence thereof and the refractive indexes of the non-polarity liquid 42 and the polarity liquid 43.

With this liquid optical element 41, in the state with no voltage application between the electrodes 44A and 44B (in the state when the electrodes 44A and 44B both have the electric potential being zero), as shown in FIG. 4(A), the interface 41S is curved convex from the side of the polarity liquid 43 toward the non-polarity liquid 42. A contact angle 42θA of the non-polarity liquid 42 with respect to the inner surface 44AS, and a contact angle 42θB of the non-polarity liquid 42 with respect to the inner surface 44BS can be adjusted by the type of a material of the hydrophobic insulation film covering the inner surfaces 44AS and 44BS. Herein, when the non-polarity liquid 42 has the refractive index larger than the polarity liquid 43, the liquid optical element 41 provides the negative refractive power. On the contrary, when the non-polarity liquid 42 has the refractive index smaller than the polarity liquid 43, the liquid optical element 41 provides the positive refractive power. For example, when the non-polarity liquid 42 is a hydrocarbon material or silicone oil, and when the polarity liquid 43 is water or an electrolytic aqueous solution, the liquid optical element 41 provides the negative refractive power. The interface 41S has a constant curvature in the Y-axis direction, and this curvature becomes the largest in this state (the state with no voltage application between the electrodes 44A and 44B).

When a voltage is applied between the electrodes 44A and 44B, as shown in FIG. 4(B), for example, the curvature of the interface 41S is reduced, and when a voltage of a predetermined level or higher is applied, the flat surface is derived. That is, the contact angles 42θA and 42θB both become right angles)(90°). This phenomenon is assumed as below. That is, by the voltage application, an electric charge is accumulated to the inner surfaces 44AS and 44BS (or to the surface of the hydrophobic insulation film covering thereover), and by the Coulomb force of the electric charge, the polarity liquid 43 with the polarity is pulled toward the inner surfaces 44AS and 44BS (or toward the hydrophobic insulation film). Thus, the area of the polarity liquid 43 being in contact with the inner surfaces 44AS and 44BS (or with the hydrophobic insulation film) is increased, and on the other hand, the non-polarity liquid 42 is so moved (deformed) by the polarity liquid 43 as to be excluded from the part where it is being in contact with the inner surfaces 44AS and 44BS (or with the hydrophobic insulation film). As a result, the interface 41B becomes more like the flat surface. Note that FIG. 4(B) shows a case where the electric potential of the electrode 44A (assumed as Va) and the electric potential of the electrode 44B (assumed as Vb) are equal to each other (Va=Vb). When the electric potential Va and the electric potential Vb are different from each other, as shown in FIG. 4(C), for example, derived is a flat surface tilted with respect to the X axis and the Z axis (with respect to the Y axis, a surface parallel thereto) (42θA#42θB). Note that FIG. 4(C) shows a case where the electric potential Vb is larger than the electric potential Va (the contact angle 42θB is larger than the contact angle 42θA). In this case, for example, incident light φ having entered the liquid optical element 41 after traveling parallel to the electrodes 44A and 44B is refracted in the XZ plane in the interface 41S, and then is deflected. As such, by adjusting the magnitudes of the electric potential Va and the electric potential Vb, the incident light φ becomes able to be deflected in a predetermined direction in the XZ plane.

Operation of Spatial Image Display Device

Figure 5:
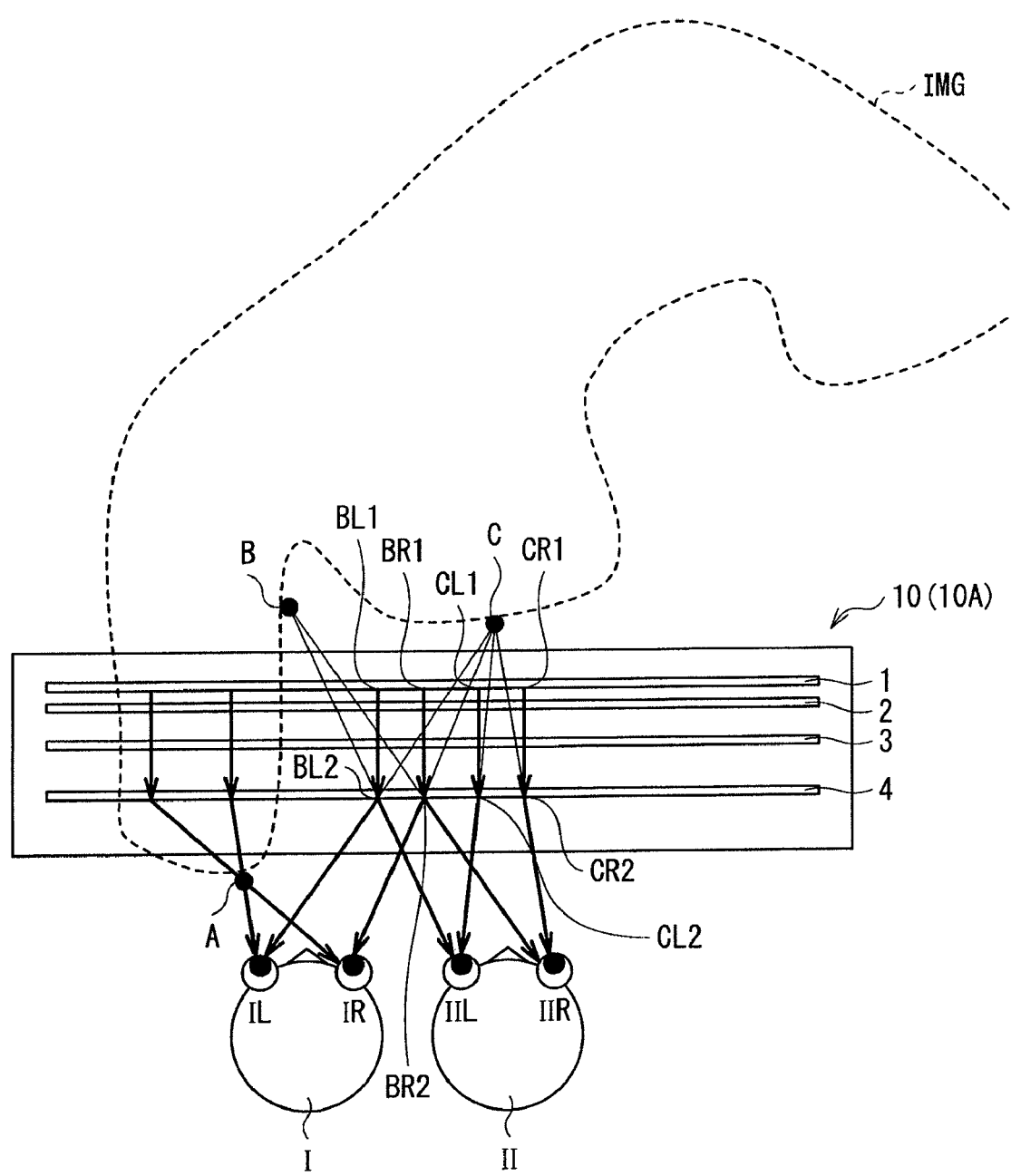
FIG. 5 A conceptual view for illustrating the operation of observing three-dimensional video in the spatial image display device shown in FIG. 1.

Next, the operation of the spatial image display device 10A is described by referring to FIG. 5.

Generally, for observing an object point on a certain object, by observing spherical waves emitted from the object point being as a point source, an observer perceives it as a "point" existing at a unique position in the three-dimensional space. Usually, in the natural world, the wavefronts emitted from an object propagate at the same time, and reach the observer constantly and continuously with a certain wavefront shape. However, other than the holography technology under the current circumstances, reproducing simultaneously and continuously the wavefronts of light waves at each point in the space is difficult. However, even when there is a certain virtual object and light waves are emitted from each virtual point, and even when the time for each of the light waves to reach the observer is somewhat inaccurate or even when the light waves reach not continuously but as intermittent optical signals, the human eyes can observe the virtual object with no unnatural feeling because of the integral action thereof. With the spatial image display device 10A in this embodiment, by forming the wavefronts at each point in the space in orderly time sequence at a high speed by utilizing the integral action of the human eyes as such, it is possible to form the three-dimensional images that are more natural than before.

With the spatial image display device 10A, spatial images can be displayed as follows. FIG. 5 is a conceptual view in a case of viewing, from the above, the state in which observers I and II observe a virtual object IMG as three-dimensional video by using the spatial image display device 10A. In the below, the operating principles thereof are described.

As an example, video light waves of an arbitrary virtual object point (e.g., a virtual object point B) on the virtual object IMG are formed as below. First of all, two types of images respectively corresponding to the right and left eyes are displayed on the display section 2. At this time, the backlight BL (not shown herein) is irradiated from a light source to the first lens array 1, and light transmitting through a plurality of microlenses 11 is converged to each corresponding pixel 22. As shown in FIG. 2(A), for example, light passing through the microlenses 11a to 11c of the microlens group $12_n$ is converged to the spots SP1 to SP3 of the pixel $22_{Rn}$. After reaching each of the pixels 22, the light is directed toward the second lens array 3 while diverging as display image light. The display image light from each of the pixels 22 is converted into parallel light or converging light when passing through the second lens array 3. As a matter of course, because displaying two images at the same time is impossible, these images are displayed one by one, and then are eventually forwarded in succession to the right and left eyes, respectively. For example, an image corresponding to a virtual object point C is displayed both at a point CL1 (for the left eye) and a point CR1 (for the right eye) in the display section 2. At this time, to the pixels 22 at the point CL1 (for the left eye) and at the point CR1 (for the right eye) in the display section 2, converging light is irradiated from their corresponding microlenses 11. The display image light emitted from the display section 2 transmits sequentially through the second lens array 3 and the deflection section 4 which is in the horizontal direction, and then reaches each of a left eye IIL and a right eye IIR of the observer II. Similarly, an image of the virtual object point C for the observer I is displayed both at a point BL1 (for the left eye) and at a point BR1 (for the right eye) in the display section 2, and after transmitting sequentially through the second lens array 3 and the deflection section 4 which is in the horizontal direction, reaches each of a left eye IL and a right eye IR of the observer I. Because this operation is performed at a high speed within a time constant of the integral effects of the human eyes, the observers I and II can perceive the virtual object point C without noticing that the images are being forwarded in succession.

The display image light emitted from the second lens array 3 is directed to the deflection section 4 as parallel light or converging light in the horizontal plane. After reaching points CL2 and CR2 in the deflection section 4, the light waves are deflected in a predetermined direction in the horizontal plane, and then are irradiated toward the left eye IIL and the right eye IIR of the observer II, respectively. Herein, for example, in such a manner that the wavefronts of the display image light reach the point CL2 when the deflection angle is directed to the left eye IIL of the observer II, and in such a manner that the wavefronts of the display image light reach the point CR2 when the deflection angle is directed to the right eye IIR of the observer II, the display section 2 forwards the image light in synchronization with the deflection angle by the deflection section 4. With the wavefronts of the display image light irradiated from the deflection section 4 reaching the left eye IIL and the right eye IIR of the observer II, the observer II can perceive the virtual object point C on the virtual object IMG as a point in the three-dimensional space. As for the virtual object point B, likewise, the image light irradiated from points BL1 and BR1 of the display section 2 respectively reach points BL2 and BR2 in the deflection section 4 after passing through the second lens array 3. After reaching the points BL2 and BR2, the light waves are deflected in a predetermined direction in the horizontal plane, and then are irradiated toward the left eye IIL and the right eye IIR of the observer II, respectively. Note that, FIG. 5 shows the state of, at the points BL1 and BR2 of the display section 2, displaying the image of the virtual object point C for the observer I, and the state of displaying the image of the object point B for the observer II. However, these are not displayed at the same time, but are displayed at different timings.

As such, in the spatial image display device 10A, the backlight BL is once converged by each of the microlenses 11 of the first lens array 1 at the spots in the effective region of each of the corresponding pixels 22, following which the display image light from the display section 2 is diverged toward the second lens array 3. Therefore, the display image light entering the second lens array 3 behaves as if it is light emitted from a point source. The display image light from the display section 2 is converted by the second lens array 3 into parallel light or converging light in the horizontal plane. Therefore, the display image light is allowed to reach the eyes of an observer not in the state of divergence in the horizontal plane but as parallel light or converging light. Accordingly, the observer can perceive three-dimensional video (a spatial image) having a superior reality (the sense of depth) and high definition. Especially when the second lens array 3 is used for conversion into parallel light in the horizontal plane, the relative position of the observer with respect to the spatial image display device 10A is not identified, thereby allowing a larger number of observers to perceive all at once three-dimensional video (a spatial image) with high definition. Moreover, because the liquid optical elements 41 is used in the deflection section 4, it is possible to achieve a compact configuration as compared with the case of using a deflector plate such as glass plate.

Modified Example 1

Figure 6:
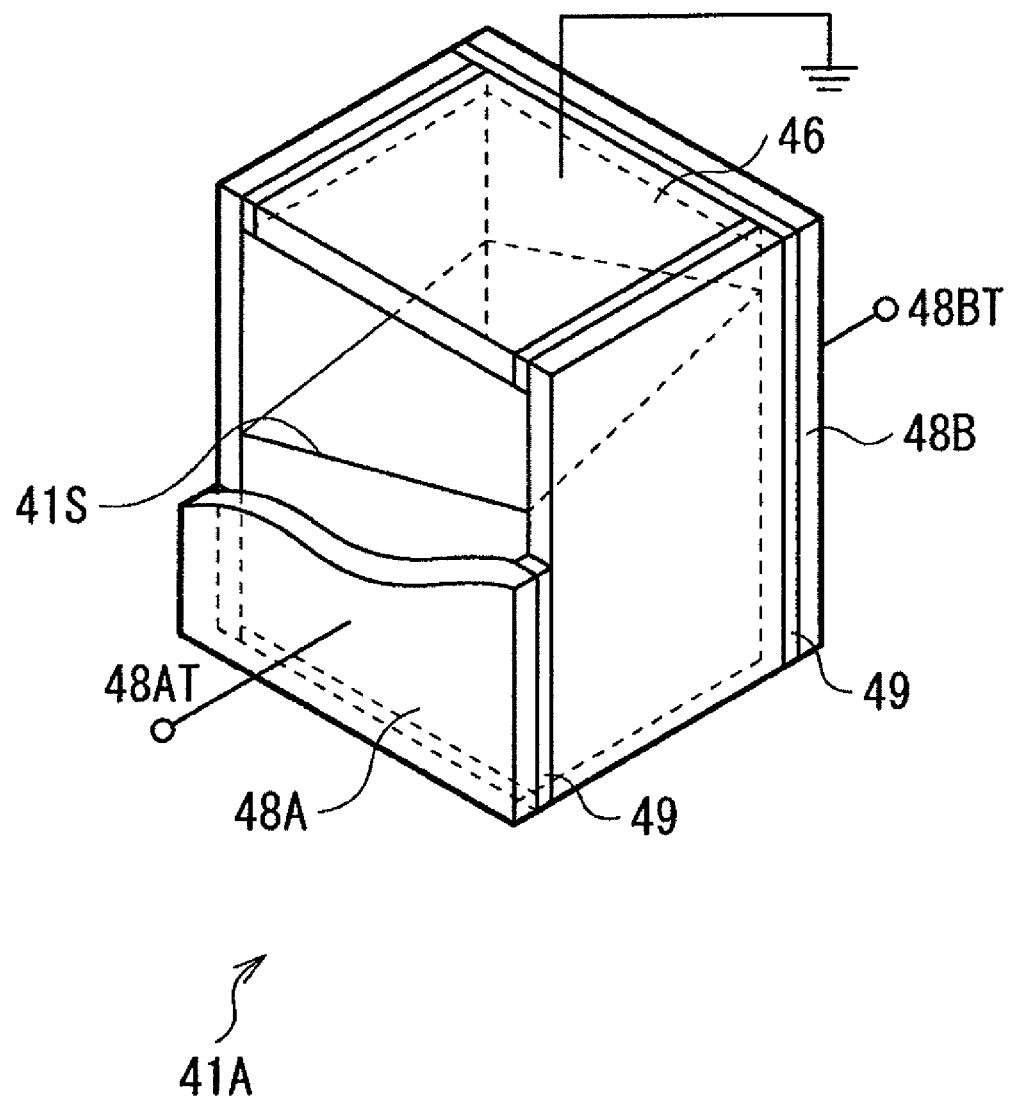
FIG. 6 A perspective diagram showing the configuration of a liquid optical element 41A as a first modified example.

Described next is a first modified example (modified example 1) in the present embodiment. In the present embodiment, the second lens array 3 is configured by the lenticular lens, and the display image light is collimated only in the horizontal plane. On the other hand, in this modified example, the second lens array 3 is configured by the placement of a plurality of spherical lenses each having the isotropic refractive power. Moreover, the deflection section 4 is configured by a liquid optical element 41A shown in FIG. 6. The liquid optical element 41A is in the configuration similar to that of the liquid optical element 41, except that a pair of electrodes 48A and 48B opposing along the Y axis are additionally provided. These electrodes 48A and 48B are each made of copper, for example, and are insulated from the bottom plate 45, the top plate 46, and the electrodes 44A and 44B via sealing sections 49, respectively. The electrodes 48A and 48B are connected to an external power supply (not shown) via terminals 48AT and 48BT connected to the outer surfaces thereof, respectively. In the liquid optical element 41A, in addition to voltage application between the electrodes 44A and 44B, a voltage is applied also between the electrodes 48A and 48A, so that the interface 41S is tiled also with respect to the Y axis. As such, by adjusting the magnitudes of electric potential of the electrode 48A and the electrode 48B, the incident light ϕ becomes able to be deflected also in a predetermined direction (also in the vertical direction) in the YZ plane. In such a case, even when the virtual line connecting the eyes of an observer is off the horizontal direction (tilted) (even when the observer is in the posture of lying down), the three-dimensional viewing is possible since a predetermined image reaches the right and left eyes.

Modified Example 2

Figure 7:
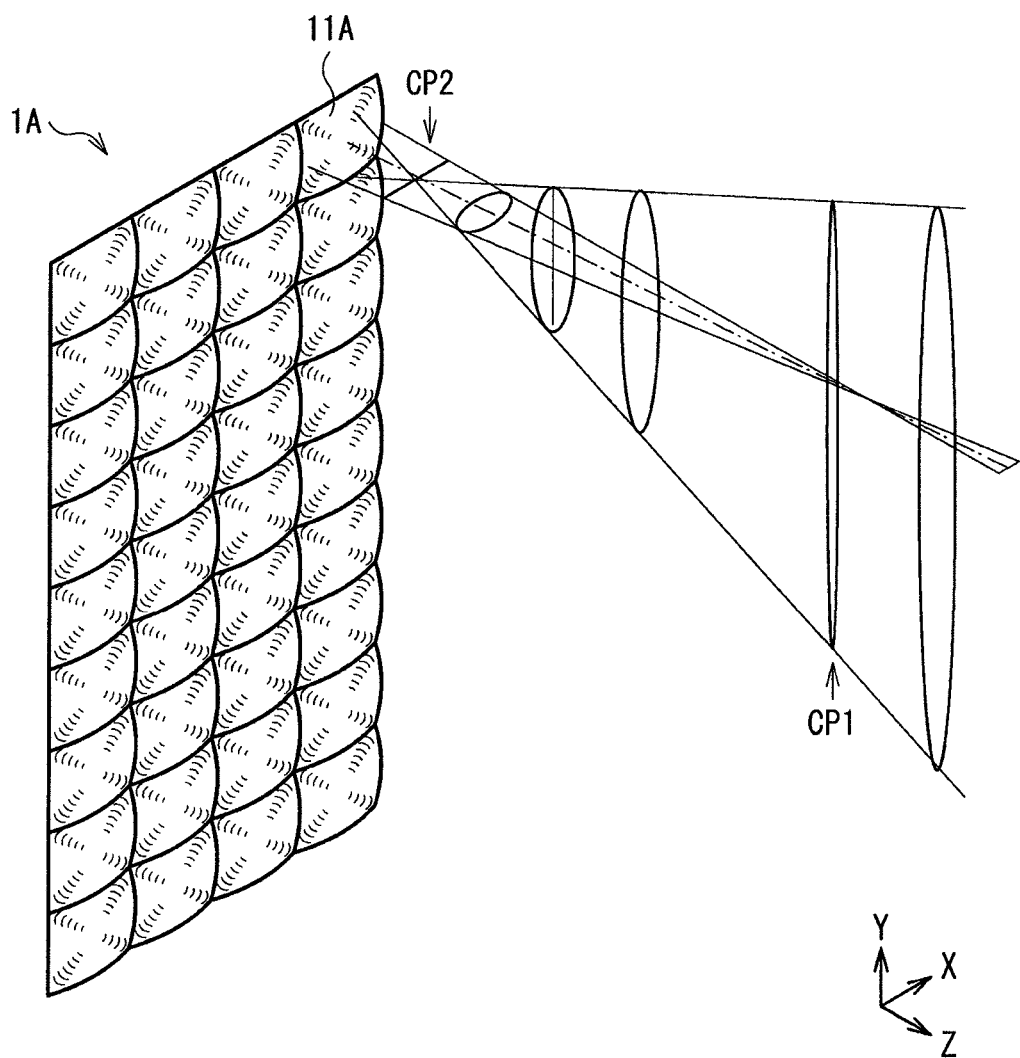
FIG. 7 A conceptual view showing the perspective configuration of a first lens array 1A as a second modified example, and the state of travel of transmission light thereof.

Next, by referring to FIG. 7, described is a second modified example (modified example 2) in the first embodiment described above. In this modified example, a first lens array 1A is provided as an alternative to the first lens array 1. FIG. 7 shows the state of travel of light transmitting through the first lens array 1A (a change in a spread of light on the surface orthogonal to the optical axis) together with the perspective configuration of the first lens array 1A.

As shown in FIG. 7, microlenses 11A in the first lens array 1A have a focus position CP1 in a first plane including the optical axis (XZ plane) different from a focus position CP2 in a second plane including the optical axis (XY plane). That is, the microlens 11A has the lens surface in the shape of elliptical sphere, and light transmitting through the microlens 11A comes into focus at the focus position CP1 on the XZ plane, and comes into focus at the focus position CP2 on the XY plane. In this case, it is made to pass through the pixels 22 at the focus position CP1 or at the focus position CP2, for example. Note here that the positions of the pixels 22 are not specifically restrictive as long as the outer edge of the light (the pass-through region) coming from the microlenses 11 fits in the effective region of each of the pixels 22.

In the case of this modified example, because the microlenses 11A cause divergence of display image light in the vertical direction, even when an observer stands at a position somewhat off from the up-and-down direction (the vertical direction) of the screen, the observer can view the spatial image. Note here that, with the configuration of the first embodiment described above, because the second lens array 3 is a lenticular lens, the angle of divergence defined by the microlenses 11 in the vertical direction can be obtained. However, there may be a case where the angle of divergence defined by the microlenses 11 as such is small, and an allowable range (observable range) of the relative position between the spatial image device 10A that allows the observer to perceive the spatial image and the observer may not be enough. In consideration thereof, by using the microlenses 11A having the lens surface in the shape of elliptical sphere as in this modified example, it is possible to widen the observable range to some extent in the vertical direction.

Modified Example 3

Figure 8:
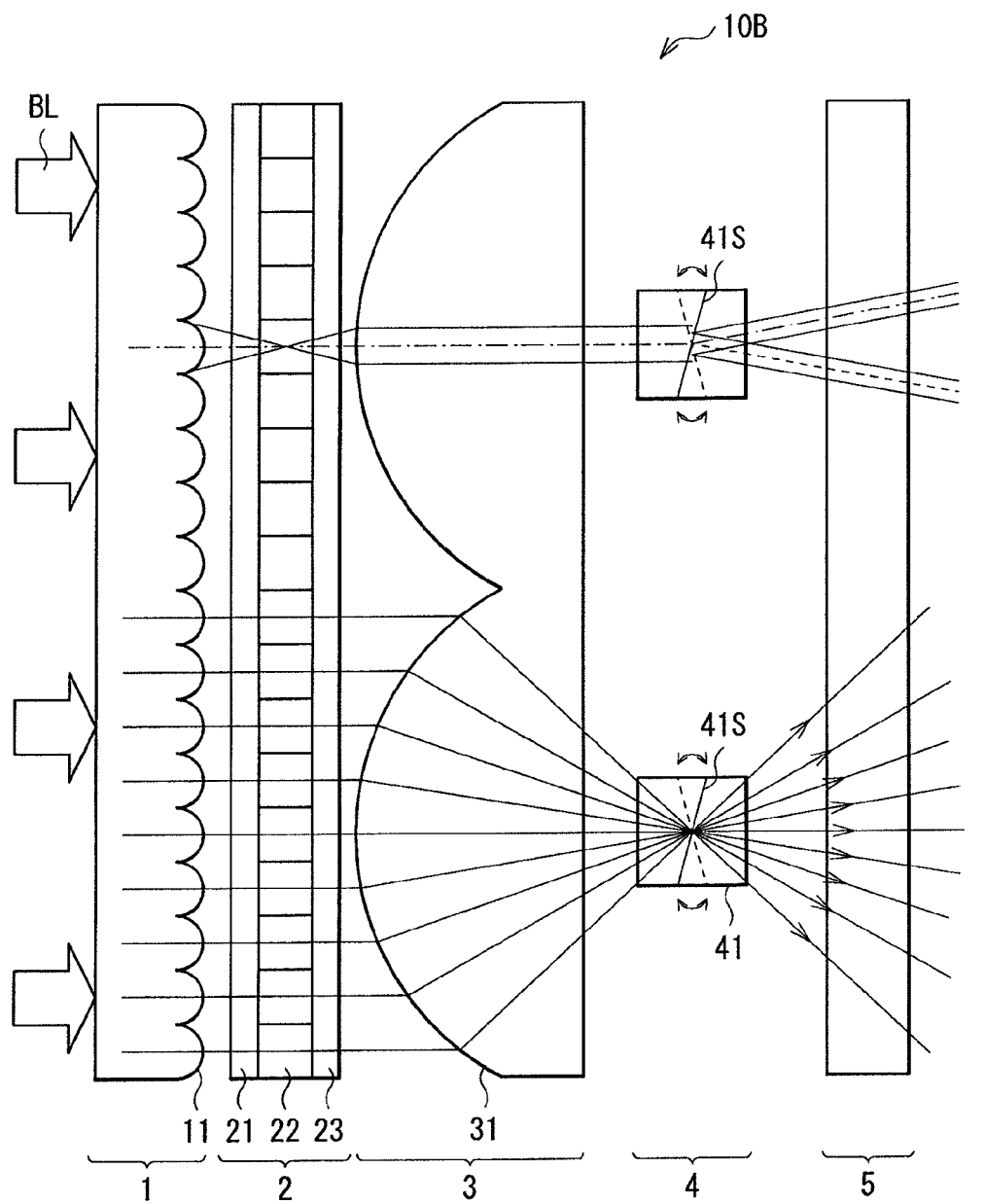
FIG. 8 A schematic diagram showing an exemplary configuration of a spatial image display device 10B in a horizontal plane as a third modified example.
Figure 9:
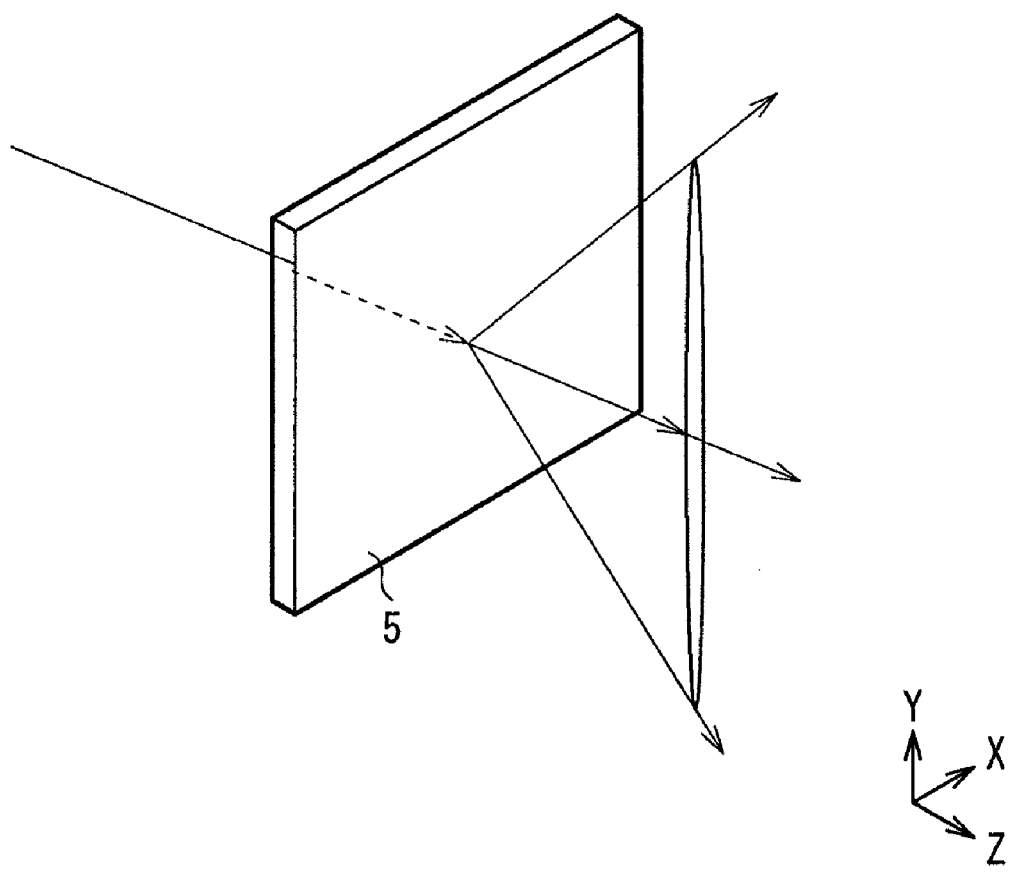
FIG. 9 A conceptual view showing the perspective configuration of a diffusion plate shown in FIG. 8, and the state of travel of transmission light thereof.

Next, by referring to FIGS. 8 and 9, described is a spatial image display device 10B as a third modified example (modified example 3) in the present embodiment. FIG. 8 is a diagram showing an exemplary configuration of the spatial image display device 10B in the horizontal plane.

The spatial image display device 10B is additionally provided with a diffusion plate 5 on the projection side of the deflection section 4. FIG. 9 shows the state of travel of light transmitting through the diffusion plate 5 (a change in a spread of light on the surface orthogonal to the optical axis) together with the perspective configuration of the diffusion plate 5 shown in FIG. 8. The diffusion plate 5 is for diffusing light from the deflection section 4 only in the vertical direction (Y-axis direction). The light from the deflection section 4 is not to be diffused in the X-axis direction. As such a diffusion plate 5, a lens diffusion plate (Luminit (USA), LLC; model LSD40×0.2 or others) may be used, for example. Alternatively, like the second lens array 3 shown in FIG. 3, for example, a lenticular lens may be used in which a plurality of cylindrical lenses are arranged. Note that, in this case, the cylindrical lenses each have the cylindrical surface surrounding the axis along the X axis, and are aligned in the Y-axis direction. Moreover, the cylindrical surface of the cylindrical lenses may have a curvature as large as possible, and the lenticular lenses may be increased in number per unit length in the Y-axis direction. Note that, herein, the diffusion plate 5 is disposed on the projection side of the second lens array 3, but may be disposed between the first lens array 1 and the second lens array 3.

In this modified example, the diffusion plate 5 is used to diffuse display image light in the vertical direction. Therefore, similarly to the modified example 2, even when an observer stands somewhat off in the up-and-down direction (the vertical direction) of the screen, the observer can perceive the spatial image. The observable range in the vertical direction in this case can be widened to more extent than in the modified example 2.

Modified Example 4

Figure 10:
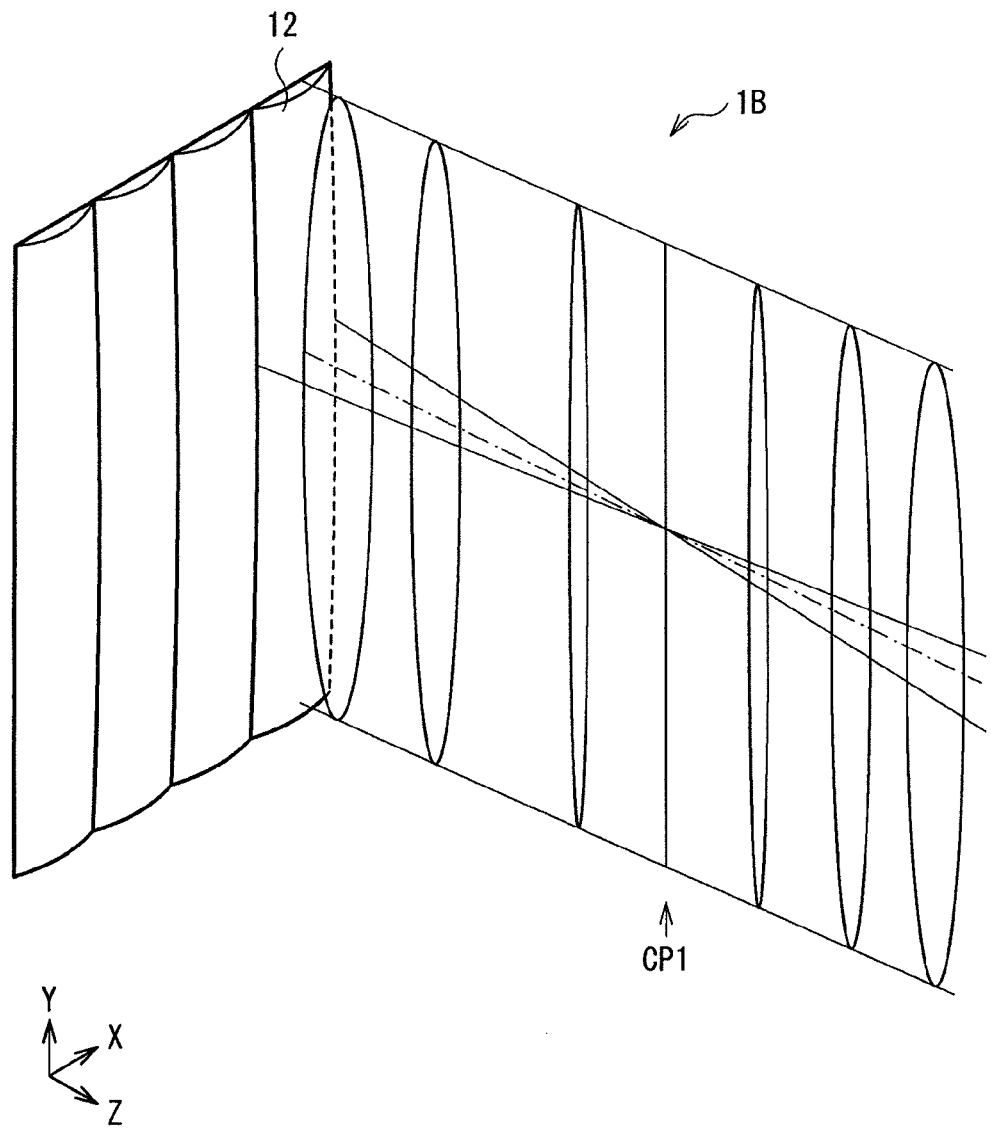
FIG. 10 A conceptual view showing the perspective configuration of a first lens array 1B as a fourth modified example, and the state of travel of transmission light thereof.

Next, by referring to FIG. 10, described is a first lens array 1B as a fourth modified example (modified example 4) in the present embodiment. FIG. 10 shows the state of travel of light transmitting through the first lens array 1B (a change in a spread of light on the surface orthogonal to the optical axis) together with the perspective configuration of the first lens array 1B.

As shown in FIG. 10, the first lens array 1B has a configuration in which a plurality of cylindrical lenses 12, each having the cylindrical surface surrounding the axis along the vertical direction (Y-axis direction), are aligned along the X-axis direction. The cylindrical lenses 12 function to converge the backlight BL only in the horizontal plane (XZ plane). That is, the light transmitting through the cylindrical lenses 12 comes into focus at the focus position CP1 on the XZ plane. In this case, it is made to pass through the pixels 22 at the focus position CP1, for example. Note here that the positions of the pixels 22 are not specifically restrictive as long as the outer edge of the light (the pass-through region) coming from the cylindrical lenses 12 fits in the effective region of each of the pixels 22.

Also in this modified example, the effects similar to those in the first embodiment described above can be achieved. Note that, also in this case, when the diffusion plate 5 in the modified example 3 described above is additionally provided, the effects similar to those in the modified example 3 can be achieved. Moreover, the first lens array 1B in this modified example can be manufactured in a more simplified manner and with higher precision than the first lens arrays 1 and 1A including the microlenses 11 and 11A. That is, because a cross-sectional shape of the XZ plane in each of the cylindrical lenses 12 is uniform, cutting may be performed along the Y-axis direction to form a groove extending in the Y-axis direction when manufacturing a mold. On the other hand, for manufacturing a mold of the microlens arrays 11 and 11A aligned in both the X-axis direction and the Y-axis direction, there needs to manufacture the lens surfaces one by one by using an NC lathe or others. Therefore, this is not only cumbersome but this also may cause an error in the relative position between the microlenses 11 and 11A easily.

Second Embodiment

Figure 11:
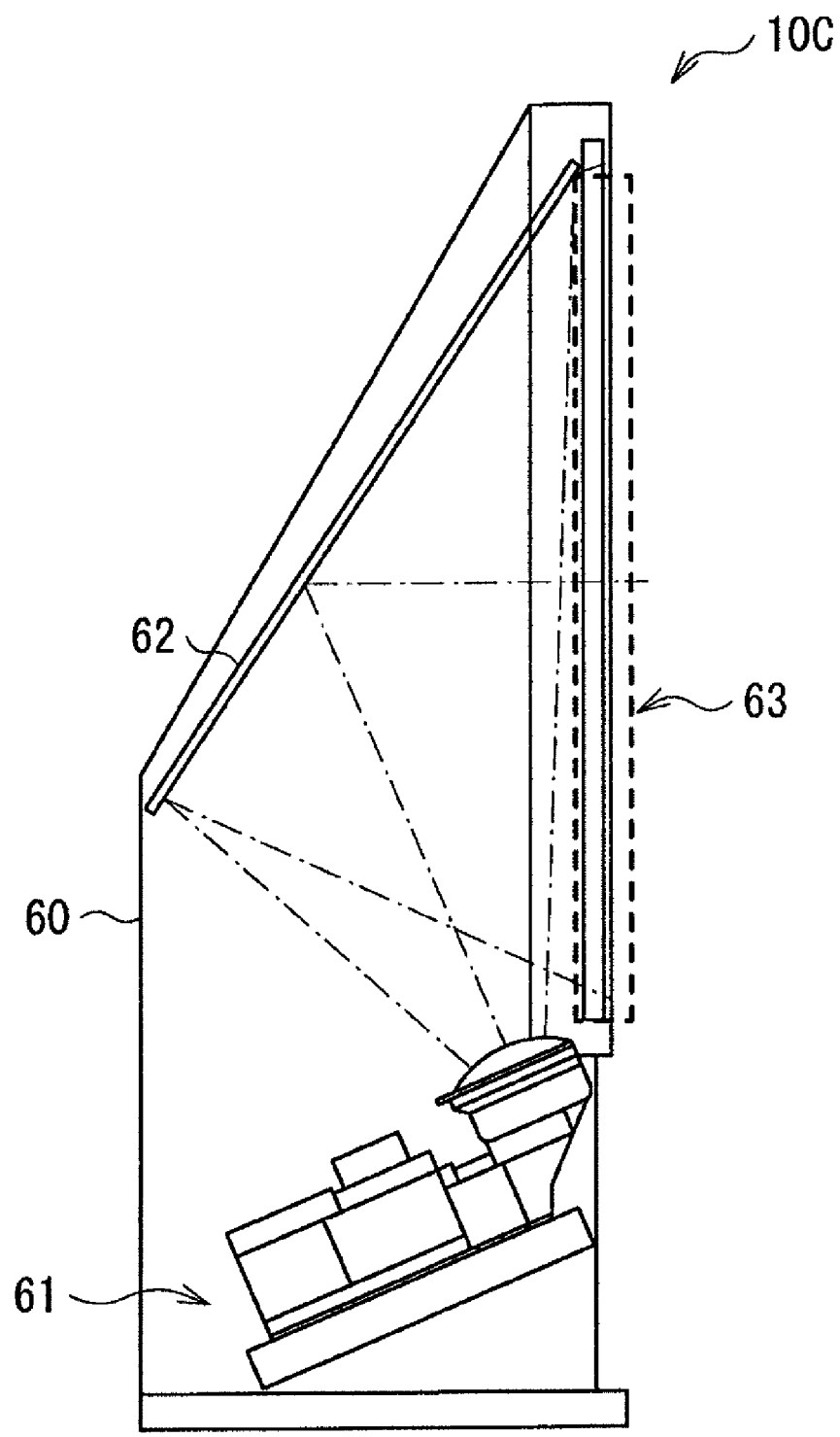
FIG. 11 A schematic diagram showing an exemplary configuration of a spatial image display device as a second embodiment of the invention.
Figure 12:
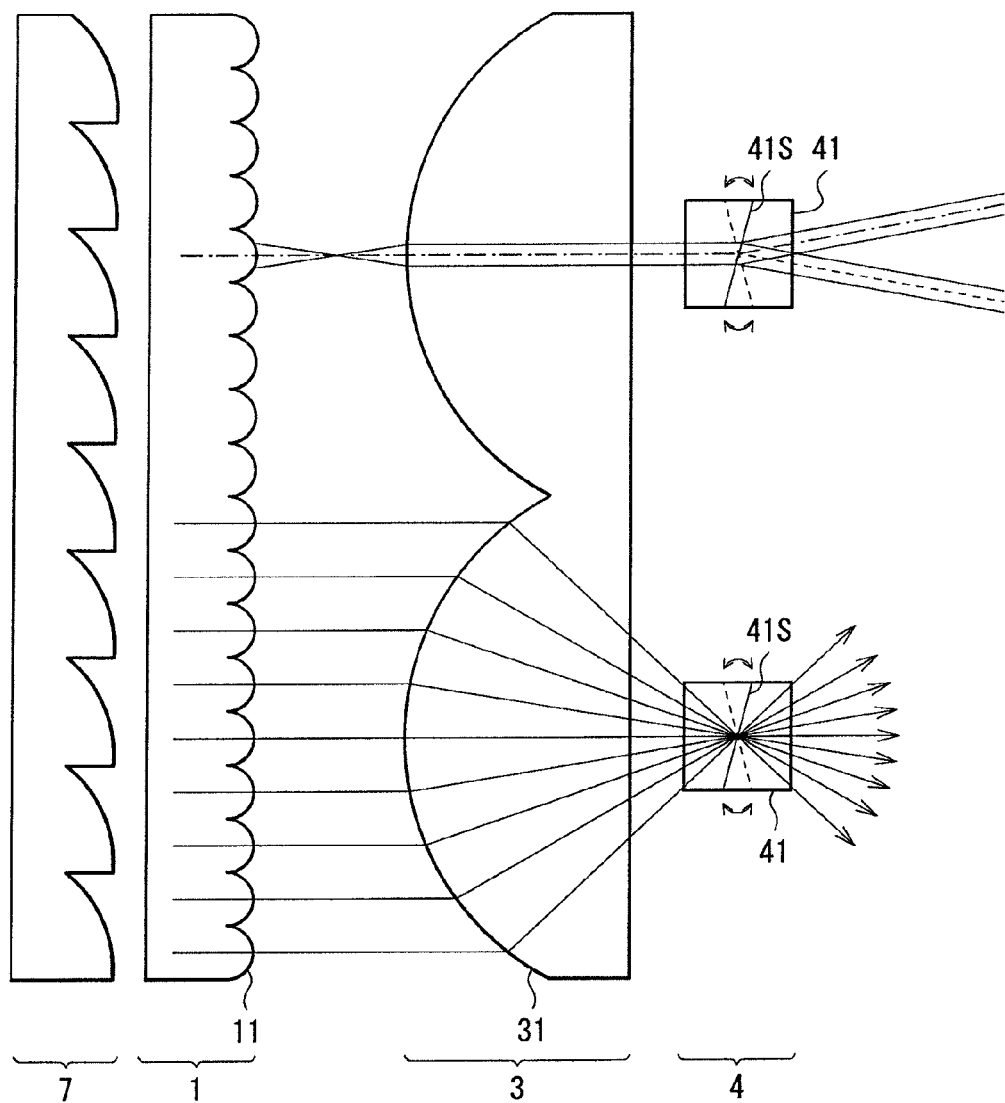
FIG. 12 A schematic diagram showing an exemplary configuration of a lens unit in the spatial image display device shown in FIG.
Figure 13:
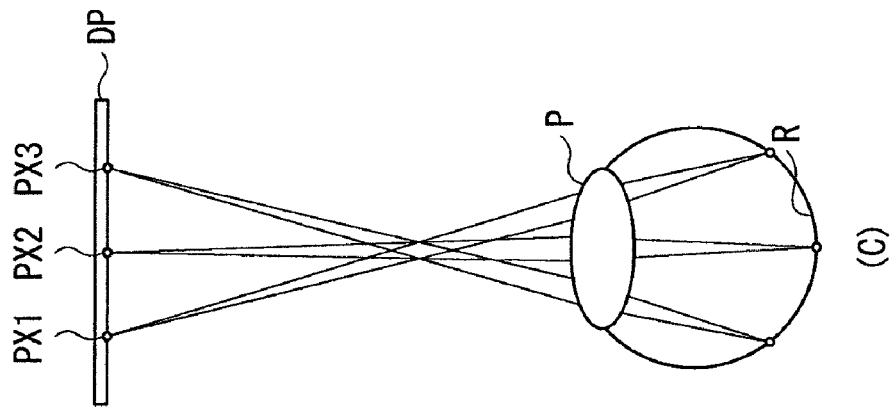
FIG. 13 Conceptual views each for illustrating the relationship between a light source and the divergence of light passing through a lens.
Figure 13:
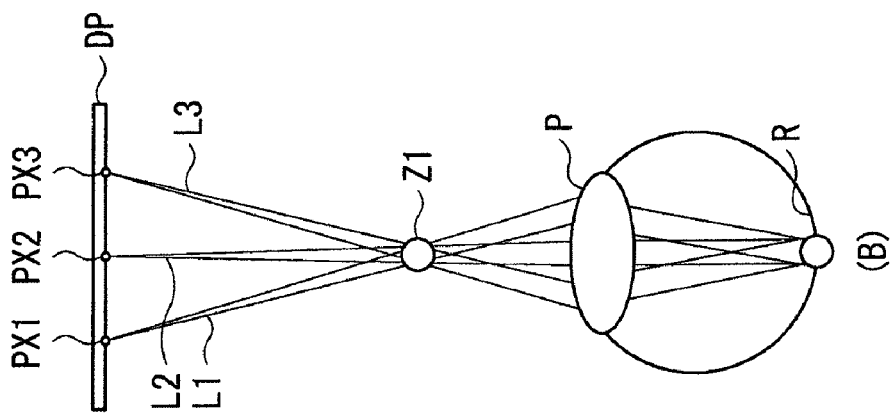
Figure 13:
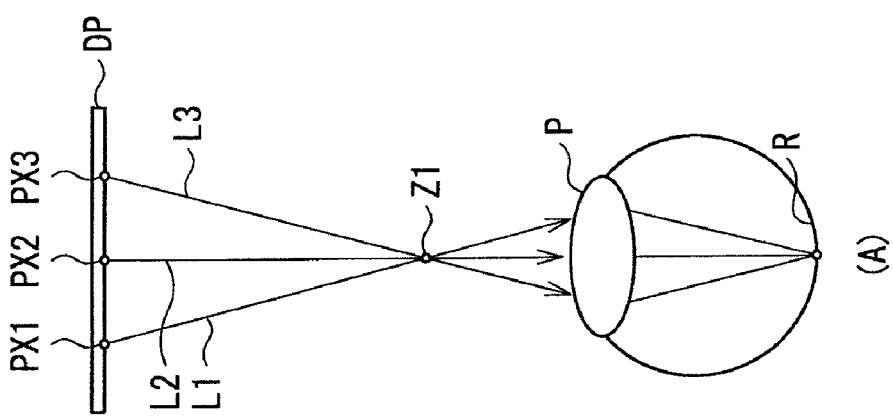
Figure 14:
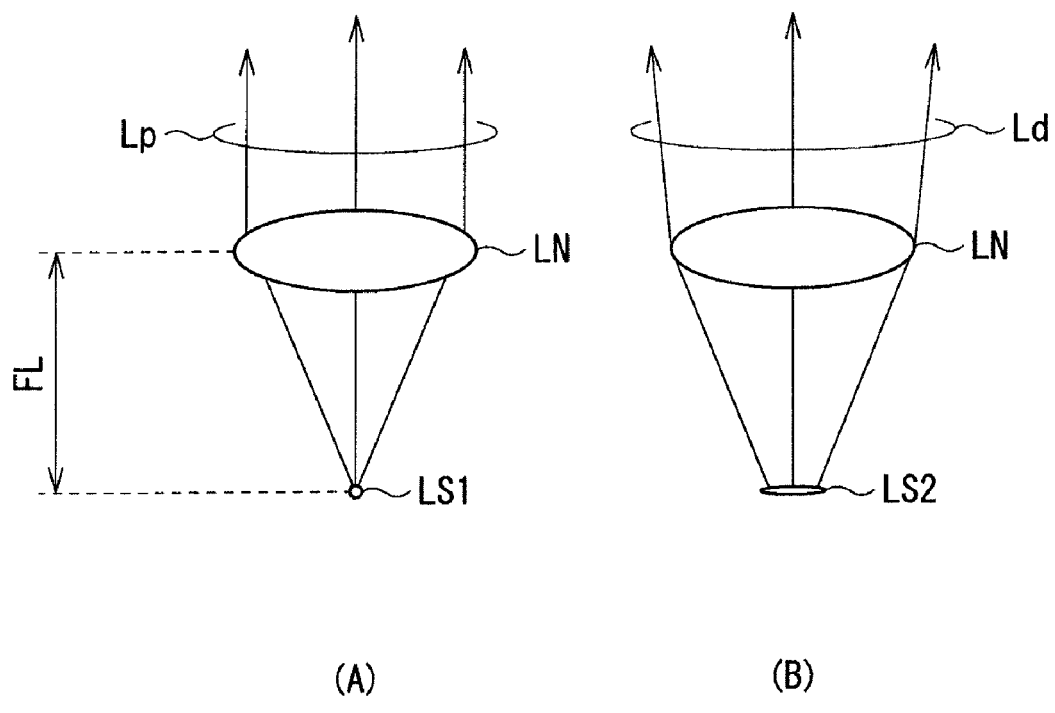
FIG. 14 Conceptual views each for illustrating the relationship between the type of a light beam coming from a display and an image to be perceived by an observer.

Next, by referring to FIGS. 11 and 12, a spatial image display device 10C as the second embodiment of the invention is described. FIG. 11 is a schematic diagram showing the entire configuration of the spatial image display device 10C. FIG. 12 is an enlarged view of a part of the region enclosed by broken lines shown in FIG. 11.

The spatial image display device 10C is a so-called rear projector display, and is provided, inside of a chassis 60, with a projection optical unit 61, a reflective mirror 62, and a lens unit 63. In this spatial image display device 10C, a display section (not shown) for generating two-dimensional display images is provided inside of the projection optical unit 61, and display image light emitted from the display section reaches the lens unit 63 via the reflective mirror 62. FIG. 12 shows an exemplary configuration of the lens unit 63 in the horizontal plane. As shown in FIG. 12, the lens unit 63 has a configuration in which a Fresnel lens 7, the first lens array 1, the second lens array 3, and the deflection section 4 are arranged in order from the side of the projection optical unit 61. The Fresnel lens 7 is for converting display image light, which enters from the projection optical unit 61 via the reflective mirror 62, into parallel light. Herein, the first lens array 1, the second lens array 3, and the deflection section 4 are similar to those in the first embodiment described above, and thus descriptions thereon are omitted here. The display image light from the projection optical unit 61 is emitted in a state in which color lights of red (R), green (G), and blue (B) are not synthesized and are separated, and the color lights enter, with a state in which they are separated, the microlenses 11 that correspond to the respective pixels 22R, the pixels 22G, and the pixels 22B. The display image light emitted from each of the microlenses 11 enters the second lens array 3 after converging, and then is directed to the deflection section 4 after being converted into parallel light or converging light by the second lens array 3. The display image light that has reached the deflection section 4 is deflected in an appropriate direction, and reaches the observer.

As such, in the case that the display section is disposed not between the first lens array 1 and the second lens array 3 but on the incident side of the first lens array 1, the effects similar to those in the first embodiment described above can be achieved.

Note that, in the embodiment, in the vicinity of an imaging point between the first lens array 1 and the second lens array 3, a diffusion plate for diffusing light in the vertical direction (an anisotropic diffusion plate), or a diffusion plate for diffusing light in both the vertical direction and the horizontal direction (an isotropic diffusion plate) may be disposed. If this is the case, the observable range in the vertical direction can be widened, and even when an observer stands at a position somewhat off in the up-and-down direction (the vertical direction), the observer can perceive the spatial image. Moreover, also in this embodiment, the first to fourth modified examples described in the first embodiment above can be respectively applied, and the effects similar thereto can be achieved.

As such, although the invention is described by exemplifying several embodiments and modified examples, the invention is not limited to the embodiments and others described above, and various many modification can be made. In the embodiments and others described above, for example, described is the case of using a liquid crystal device as a display device, but this is not restrictive. For example, self-emitting elements such as organic EL elements, plasma light-emitting elements, field emission (FED) elements, and light-emitting diodes (LED) may be arranged in an array for application as a display device. When such a self-emitting display device is used, there is no need to separately provide a light source for backlight use, thereby being able to achieve a more simplified configuration. Further, the liquid crystal device described in the embodiments and others above is the one functioning as a transmission-type light valve, but alternatively, a reflective-type light valve such as GLV (Grating Light Valve) or DMD (Digital Multi Mirror) may be used as a display device.

Still further, in the modified example 1 in the first embodiment described above, the deflection section 4 performs deflection of the display image light in the horizontal direction at the same time as deflection thereof in the vertical direction. Alternatively, the deflection in the horizontal direction and the deflection in the vertical direction may be performed separately by any other means.

The invention claimed is:

1. A spatial image display device, comprising:
   two-dimensional image generation means including a plurality of pixels, and generating a two-dimensional display image corresponding to a video signal;
   a first lens array including a plurality of first lenses provided in correspondence with the respective pixels, the first lenses allowing light passing through the respective pixels to converge; and
   a second lens array converting the converging light, which has passed through the first lens array, into parallel light or converging light, and allowing the converted light to pass therethrough, wherein a focus position on a first plane of the first lens is different from a focus position on a second plane of the first lens, the first plane including an optical axis, and the second plane including the optical axis and being orthogonal to the first plane.

2. The spatial image display device according to claim 1, wherein a distance between the first lens array and the second lens array is equal to or larger than a sum of a focal length of the first lens and a focal length of the second lens.

3. The spatial image display device according to claim 1, further comprising light collimation means for converting the light entering the first lens array into parallel light.

4. The spatial image display device according to claim 1, wherein the two-dimensional image generation means is positioned, on an optical axis, between the first lens array and the second lens array.

5. The spatial image display device according to claim 1, wherein the two-dimensional image generation means is positioned, on an optical axis, on a light-incident side of the first lens array.

6. The spatial image display device according to claim 1, wherein the second lens array is configured of a plurality of cylindrical lenses, the cylindrical lenses each having a cylindrical surface surrounding an axis along a first direction orthogonal to an optical axis and being arranged side by side in a second direction orthogonal to both the optical axis and the first direction.

7. The spatial image display device according to claim 6, further comprising an anisotropic diffusion plate disposed between the first lens array and the second lens array, or on a light-projection side of the second lens array, the anisotropic diffusion plate allowing incident light to be dispersed in the first direction.

8. The spatial image display device according to claim 6, wherein the first lens array is configured of a plurality of cylindrical lenses each having a cylindrical surface surrounding an axis along the first direction and being arranged side by side in the second direction.

9. The spatial image display device according to claim 5, further comprising an isotropic diffusion plate disposed at a position where the light passing through the first lens array converges, the isotropic diffusion plate allowing the light which has passed through the first lens array to be dispersed in a isotropic manner along a plane orthogonal to the optical axis.

10. A spatial image display device, comprising:
two-dimensional image generation means including a plurality of pixels, and generating a two-dimensional display image corresponding to a video signal;
a first lens array including a plurality of first lenses provided in correspondence with the respective pixels, the first lenses allowing light passing through the respective pixels to converge; and
a second lens array converting the converging light, which has passed through the first lens array, into parallel light or converging light, and allowing the converted light to pass therethrough, further comprising a plurality of liquid optical elements each disposed for each of the pixels or for a group of pixels to deflect the light emitted from the second lens array in a horizontal direction, wherein
each of the liquid optical elements includes a pair of electrodes, polarity liquid and non-polarity liquid, the polarity liquid and the non-polarity liquid having refractive indexes different from each other and being encapsulated between the pair of electrodes with a state isolated from each other in a direction of the optical axis.

11. The spatial image display device according to claim 10, wherein the polarity liquid is in contact with a ground electrode disposed away from the pair of electrodes.

12. The spatial image display device according to claim 10, wherein opposing surfaces of the pair of electrodes are covered with insulation films, the insulation films each having an affinity for the non-polarity liquid under an absence of electric field.

13. A spatial image display device, comprising:
two-dimensional image generation means including a plurality of pixels, and generating a two-dimensional display image corresponding to a video signal;
a first lens array including a plurality of first lenses provided in correspondence with the respective pixels, the first lenses allowing light passing through the respective pixels to converge;
a second lens array converting the converging light, which has passed through the first lens array, into parallel light or converging light, and allowing the converted light to pass therethrough; and
a plurality of liquid optical elements deflecting the light emitted from the second lens array,
wherein each of the liquid optical elements includes:
a pair of electrodes;
a ground electrode; and
polarity liquid and non-polarity liquid, the polarity liquid and the non-polarity liquid having refractive indexes different from each other and being encapsulated between the pair of electrodes, and
wherein the polarity liquid is in contact with the ground electrode.

* * * * *